United States Patent [19]
Nogler

[11] 3,856,421
[45] Dec. 24, 1974

[54] SUPPORT POLE
[75] Inventor: Walter Nogler, Innsbruck, Austria
[73] Assignee: Gebruder Kollensperger, Innsbruck, Austria
[22] Filed: May 2, 1973
[21] Appl. No.: 356,447

[30] Foreign Application Priority Data
May 2, 1972  Austria .................... 3783/72

[52] U.S. Cl. .............. 403/118, 248/354 S, 403/344
[51] Int. Cl. .......................................... E04g 25/06
[58] Field of Search.................... 403/118, 343, 344; 248/354 S

[56] References Cited
UNITED STATES PATENTS

| | | | |
|---|---|---|---|
| 1,018,910 | 2/1912 | Kahle | 403/118 |
| 1,612,124 | 12/1926 | Huelsick | 248/354 S UX |
| 2,591,253 | 4/1952 | Grismore | 403/344 X |
| 2,705,605 | 4/1955 | Kreissig et al. | 248/354 S |
| 3,224,800 | 12/1965 | Fisher | 403/118 |
| 3,603,552 | 9/1971 | Wheelock | 248/354 S |

Primary Examiner—Werner H. Schroeder
Attorney, Agent, or Firm—Wenderoth, Lind & Ponack

[57] ABSTRACT

A support device for scaffolds, racks or the like, has an inner displaceable spindle held in a lock nut resting on an outer tube. The lock nut is split and at least one part is displaceable in a plane normal to the axis of the nut and the spindle, so that the latter can be released from the nut in order to allow relative movement. A fine adjustment is achieved by turning the nut while its parts are in locking position with the spindle.

8 Claims, 9 Drawing Figures

Patented Dec. 24, 1974

SUPPORT POLE

BACKGROUND OF THE INVENTION

The invention relates to a supporting device, preferably for scaffolds, formworks and such devices used in construction, having an external tube, a screw spindle, and a built-up split nut that fixes the screw spindle telescopically movably within the external tube. The split nut has a revolving position at the end of the external tube through which the screw spindle is moved.

Such supporting devices are known and are used in construction mainly for ceiling supports and height-adjustable legs of scaffolds. These known supporting devices are especially advantageous since the screw spindle can be freely moved within the external tube when the split nut is open, e.g., for a rough adjustment of a ceiling support. Fine adjustment can be achieved by turning the split nut that is engaged into the screw spindle. This fine adjustment also allows the raising or lowering of loads, that could possibly press on to the screw spindle.

Supporting devices are known whose split nut consists of two halves that are linked by a hinge. The two halves are forced into an engagement position with the external thread of the screw spindle by a locking device. With these devices a hinge parallel to the axis of the screw spindle is provided. The opening of the halves is achieved by a spring placed between the two halves. This spring, however, often does not have the power to part the halves from the screw spindle, because rather often there are certain locking forces on the split nut.

With these known supporting devices firmness and resistability of the locking devices are not achieved due to their complicated construction.

Also, rough use, especially on building sites, causes frequent failures. The complicated construction of the locking device demands many expensive parts. The assembly of which causes large time losses during operation. Furthermore, frequent difficulties are caused by sand, mortar, etc., which enters between the halves of the split nut linked by the hinge and thus blocks the locking position.

It is a further disadvantage of these known supporting devices that on opening the locking device the thread of the screw spindle is inconstantly set free. As the split nut opens like a hinge, a constant setting-free of the total surface of the thread of the screw spindle is not possible. If a load exists on the screw spindle such an inconstant setting-free of the thread would put inconstant load on the threads of the screw spindle and of the split nut whereby such load would easily result in a rupture of the thread. In order to achieve as uniform as possible release or setting-free of the thread, the hinges of these known supporting devices are positioned as far away from the axis of the screw spindle require considerable room and material, which has an unfavourable influence on use, weight and cost of the device.

SUMMARY OF THE INVENTION

It is the object of this invention to develop a built-up split nut that is characterized by its high working qualities, small dimensions and reliability. Furthermore, load transmission through the threads of the screw spindle should be as constant as possible over the total surface of the thread. It is a further object of this invention to produce such locking device with as few parts as possible that should be simple and easily assembleable.

According to the invention this can be achieved if the parts of the split nut approach each other in a linear and radial movement in the opening or locking phase. The radial and linear movement of the halves of the split nut allows a gradual engagement of the thread of the nut into the thread of the spindle. Thus, a constant load transmission on the total surface of the thread is achieved, even though the nut is not completely locked or open. Moreover, expensive and delicate hinges which require considerable maintenance can be avoided.

A preferred embodiment of the invention is characterized by the fact that the built-up split nut consists of a housing and of a sliding body that can be radially moved towards the screw spindle. This sliding body in the housing allows the construction of a locking device without hinges. Moreover, the solid housing provides good protection for the sliding body.

A preferred embodiment of the invention provides a stop in the housing that keeps the sliding body in position when the split nut is locked, thus preventing the locked nut from being formed against the screw spindle thereby hindering the easy turning of the split nut because of friction of the adjacent threads.

In a preferred embodiment of the present invention the locking and opening of the split nut is made possible by moving the sliding body within the housing. The sliding body has a hole that goes either completely or partially therethrough. In this hole a eccentric is engaged so that it can be turned in the housing vertically to the sliding direction of the body. This eccentric is preferably linked to a locking lever. Since the eccentric is completely enclosed by the sliding body and the housing, maximum protection is guaranteed.

According to the invention the eccentric consists of two bearing shafts fixed on a common axis in the housing and one locking shaft that is placed eccentrically to the common axis of the two bearing shafts thus linking them. It is the function of the locking shaft to be forced against the surface of the opening of the sliding body on the side of the screw spindle when the split nut is locked. By this pressure effect a solid and simple locking of the split nut is achieved. The opening of the locking device is also carried out by the eccentric whereby the locking shaft is forced against the surface of the opening of the sliding body that is further away from the screw spindle. This functioning of the locking device has an advantage over a spring, since a spring often does not have the power to open the split nut, particularly when the split nut is clamped against the screw spindle. It is possible to vary the leverage of the locking shaft together with a locking lever according to the power necessary for opening or locking.

In this invention simple and labour saving mounting of the split nut is achieved by the fact that the bearing shafts have different diameters, whereby the generatrix of the bearing shaft with the larger diameter corresponds with one generatrix of the locking shaft and whereby the locking lever is fixed to the bearing shaft having a larger diameter. This manner of mounting makes it possible to mount the split nut in a very short time by inserting the eccentric together with the locking lever fixed thereto into the housing and through the hole into the sliding body after having inserted the sliding body into the housing. Thus, modern and economical operation is achieved and possible repairs can be carried out with little expenditure of time and parts.

In a preferred embodiment of this invention the eccentric is prevented from falling out by placing a locking pin into a hole of the part of the bearing shaft with the smaller diameter that protrudes the housing.

In another embodiment of the invention the eccentric can be locked by a locking device when the split nut is locked. Such a locking device is preferred when high loads are put on the screw spindle and the locking shaft alone would not be sufficient to prevent unintentional opening of the nut. One embodiment of this locking device consists of a disc that can be turned round a bolt fixed to the housing whereby it is urged into a slot of one of the bearing shafts or the locking lever by a spring.

A further embodiment of the invention for high loads provides a supporting device whereby the sliding body has a conical surface that corresponds with a conical surface of a nut screwed on to the screw spindle. In this embodiment the nut transmits locking force from the sliding body to the screw spindle.

Fixing the turning levers to the housing of the device according to the invention has the advantage that the turning levers of the split nut can be operated independently from the locking device of the split nut. Moreover, this way of mounting offers advantages for the shape of the supporting device. Since complicated shapes often cause difficulties in production and maintenance, this invention puts special emphasis on a simple and solid construction.

The invention will now be thoroughly described with reference to the accompanying drawings without the invention being limited thereto.

BRIEF DESCRIPTION OF THE DRAWINGS

FIG. 7 shows the open position of the split nut, whereas FIG. 8 shows the locked position.

DETAILED DESCRIPTION OF THE INVENTION

Figure 1:
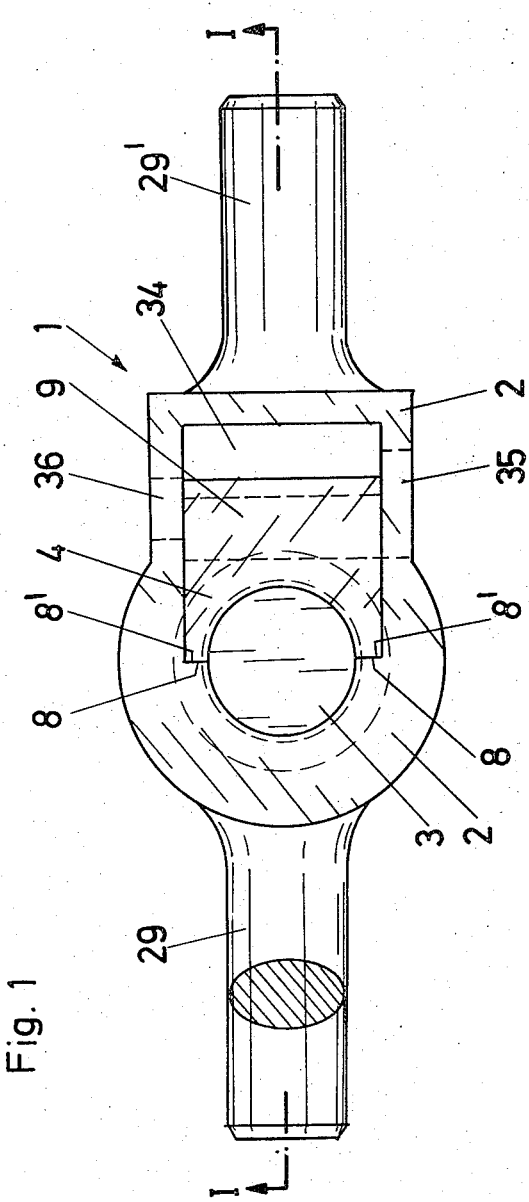
FIG. 1 is a plan view of the supporting device with the split nut in locked position and a dismounted eccentric.
Figure 2:
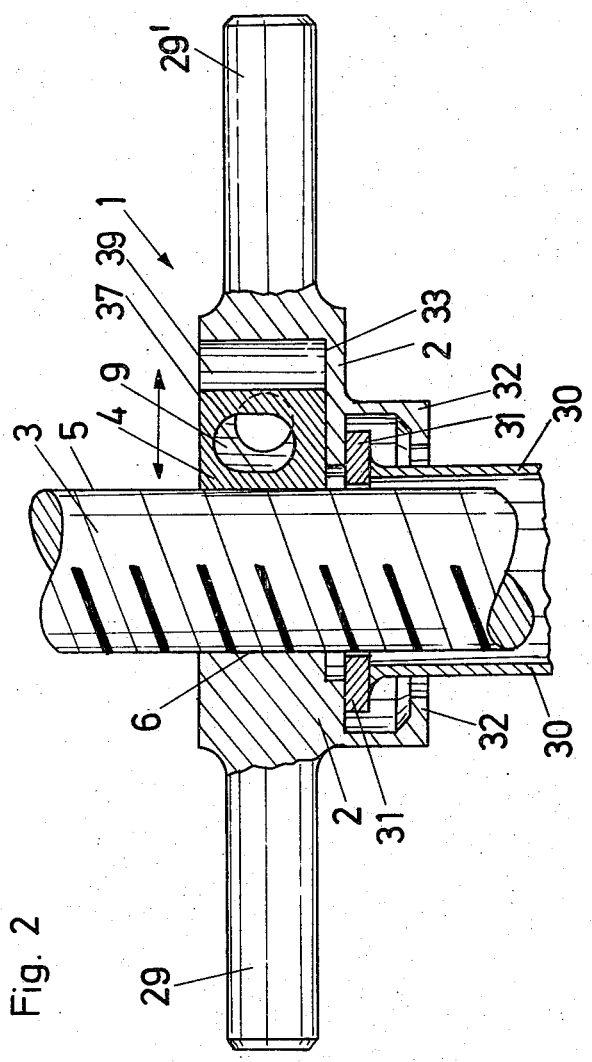
FIG. 2 is a section view taken along line I—I of FIG. 1.
Figure 3:
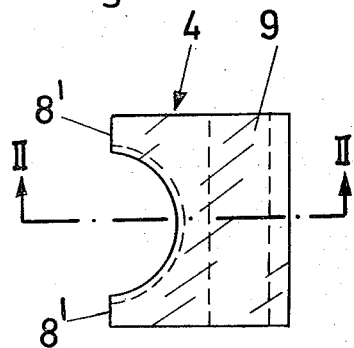
FIG. 3 is a plan view of the sliding body.
Figure 4:
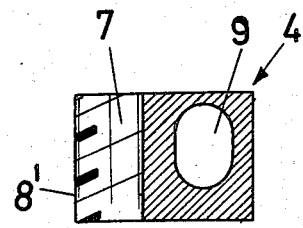
FIG. 4 is a section view taken along line II—II of FIG. 3.
Figure 5:
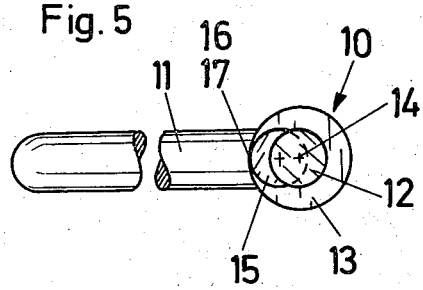
FIGS. 5 and 6 show the eccentric with welded locking lever.
Figure 6:
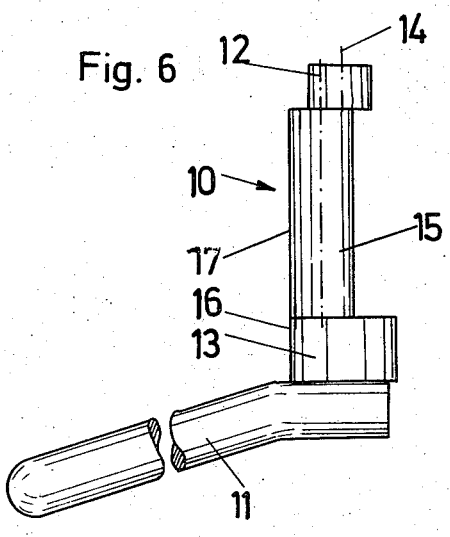

In FIGS. 1 and 2 the split nut 1 having a housing 2 is in a revolving position on flange 31 welded to the external tube 30. The rim 32 of the housing 2 of the split nut 1 prevents the split nut 1 from being removed from the external tube 30. Turning of the split nut 1 is achieved by the turning levers 29, 29' fixed to the housing 2. The screw spindle 3 is clasped by one half of the thread 6 of housing 2 and by the half thread 7 of the sliding body 4. The sliding body 4 is placed on the sliding surface 33 that forms the lower part of the recess 34 in the housing 2. In the housing 2 there are also holes 35, 36 that form the bearings for the bearing shafts 12, 13 of the eccentric 10 shown in FIGS. 5 and 6. The eccentric 10 consists of two bearing shafts 12, 13 that have a different diameter and a common axis 14 and that are linked by a locking shaft 15 of preferably circular diameter positioned eccentrically to axis 14. The locking lever 11 is welded to the bearing shaft 13 that has a bigger diameter than the bearing shaft 12. The eccentric 10 is designed such that one generatrix 16 of the bearing shaft 13 with the bigger diameter is the same as one generatrix 17 of the locking shaft 15. The sliding body 4 as shown in FIGS. 3 and 4 apart from the half of the thread 7 has an additional recess 9 whose dimensions in the sliding direction preferably correspond to the diameter of the locking shaft 15. The surface 8' of the sliding body 4 contacts the stop 8 of the housing 2 when the split nut 1 is in the locked position.

Figure 7:
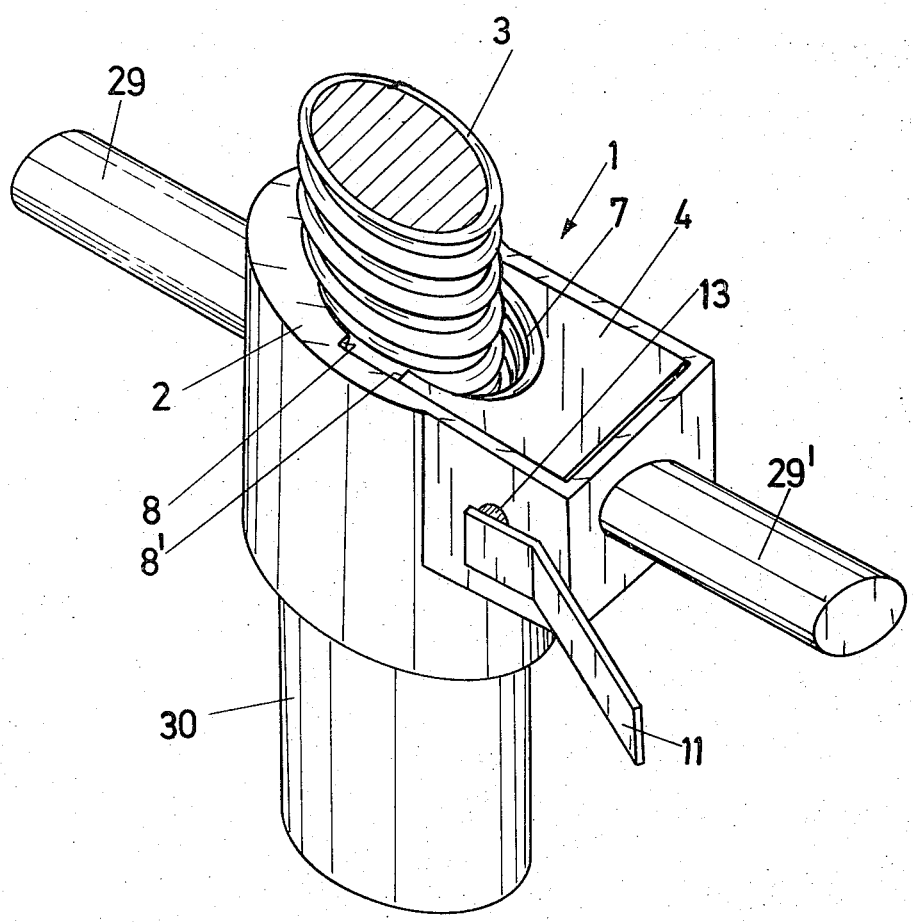
FIG. 7 and FIG. 8 are perspective views that show the supporting device with a mounted eccentric and a locking device.
Figure 8:
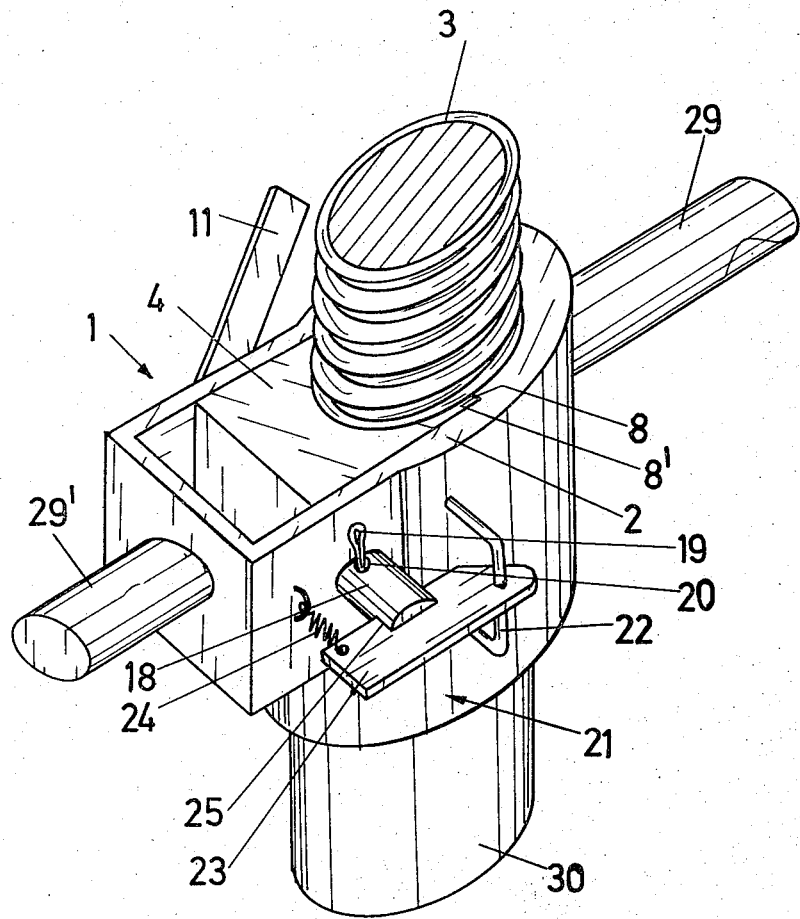

As shown in the FIGS. 7 and 8 the locking shaft 15 of the eccentric 10 forces the sliding body 4 against the screw spindle 3 when the split nut 1 is locked, whereby the locking shaft 15 is pressed against a surface 37 of the hole 9 in the sliding body 4 facing the screw spindle 3. In the perspective view of FIG. 8 a locking device 21 is also shown. The locking is carried out by a disc 23, that can be turned round a bolt 22 fixed to the housing 2. The disc 23 is engaged in the slot 25 when the split nut 1 is locked. This slot 25 is cut into a protruding part 18 of the bearing shaft 12 outside the housing 2. Automatic engaging of the disc 23 is assured by a spring 24 fixed to the disc 23 and to the housing 2. When opening the split nut 1 the disc 23 must be released from the slot 25 by hand. The pin 19 that is put through the hole 20 into the protruding part 18 of the bearing shaft 12 prevents the eccentric 10 from falling out of the housing 2.

Figure 9:
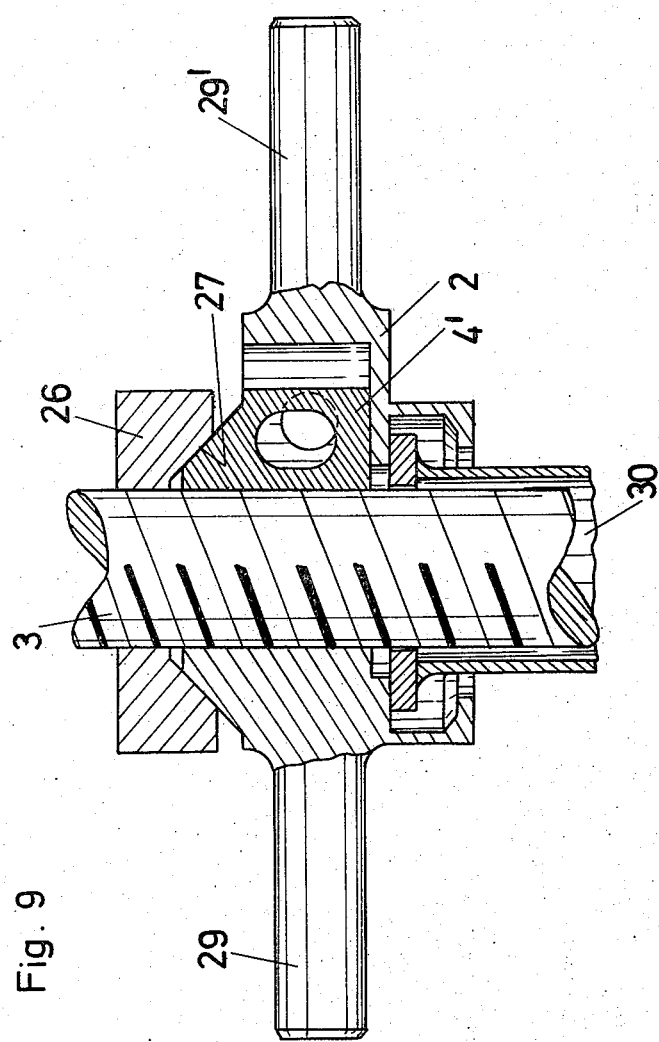
FIG. 9 is a section similar to FIG. 2, with an additional nut screwed on to the screw spindle.

In FIG. 9 the sliding body 4' has a conical upper surface 27. The conical nut 26 having a conical surface is screwed on to the screw spindle 3. When the split nut 1 is closed, the conical surface of conical nut 26 contacts the conical surface 27 and prevents any movement of the sliding body 4'.

When the split nut 1 (FIG. 7) is open, the telescopic longitudinal adjustment of the screw spindle 3 is possible. After locking the split nut 1 (FIG. 8) fine adjustment of the screw spindle 3 is possible by turning the split nut 1 with the help of the turning levers 29, 29'. To lock the split nut the locking lever 11 is turned. When the sliding body 4 or 4' contacts the stop 8, further turning of the locking lever 11 forces the locking shaft 15 against the inner surface 37 of the hole 9. Furthermore, the disc 23 of a possibly existing locking device 21 is engaged in the slot 25 and thus locks the split nut 1. In the embodiment of the supporting device with a conical nut 26 (FIG. 9) a locking device 21 is not necessary, since the conical nut 26 provides the locking of the sliding body 4'.

What we claim is:

1. A supporting device, preferably for scaffolds, formworks and such used in construction, said device comprising:
   an external tube;
   a screw spindle adjustably movable within said tube;
   a built-up split nut that fixes the position of said screw spindle telescopically movably within said external tube, said split nut being revolvably positioned at an end of said external tube through which the screw spindle is moved, said split nut comprising first and second parts movable with respect to each other in a linear and radial direction to an open and a locked position, said first part comprising a housing positioned on said end of said tube, and said second part comprising a sliding body movable in said housing in a radial direction toward and away from said screw spindle, said sliding body having a hole extending at least partially therethrough; and an eccentric positioned in said hole to be rotatable in said housing around an axis normal to the sliding direction of said sliding body.

2. A supporting device as claimed in claim 1, wherein said housing has a stop surface against which said sliding body abuts when said split nut is locked.

3. A supporting device as claimed in claim 1, wherein said eccentric comprises two bearing shafts positioned in housing and having a common axis, and one locking shaft positioned eccentrically to said common axis and connecting said two bearing shafts.

4. A supporting device as claimed in claim 3, wherein said bearing shafts have different diameters, and wherein one generatrix of said bearing shaft having the larger diameter corresponds to one generatrix of said locking shaft, and further comprising a locking lever fixed to said bearing shaft having the larger diameter.

5. A supporting device as claimed in claim 4, wherein said bearing shaft having the smaller diameter protrudes from said housing and has a hole in such protruding part, and further comprising a locking pin extending through said hole.

6. A supporting device as claim in claim 3, further comprising a locking device locking said eccentric when said split nut is locked.

7. A supporting device as claimed in claim 6, wherein said locking device comprises a disc turnably positioned around a bolt fixed to said housing, a slot positioned in one of said shafts, and a spring urging said disc into said slot.

8. A supporting device as claimed in claim 1, wherein said sliding body has a cone surface, and further comprising a conical nut having a conical surface and screw onto said screw spindle.

* * * * *